(12) United States Patent
Ichikawa

(10) Patent No.: US 12,544,996 B2
(45) Date of Patent: Feb. 10, 2026

(54) TIRE REPAIR KIT

(71) Applicant: BIB Creative Co., Ltd., Changhua (TW)

(72) Inventor: Tomonari Ichikawa, Xiushui Township (TW)

(73) Assignee: BIB CREATIVE CO., LTD., Xiushui Township (TW)

( * ) Notice: Subject to any disclaimer, the term of this patent is extended or adjusted under 35 U.S.C. 154(b) by 190 days.

(21) Appl. No.: 18/346,351

(22) Filed: Jul. 3, 2023

(65) Prior Publication Data

US 2024/0009945 A1    Jan. 11, 2024

(30) Foreign Application Priority Data

Jul. 8, 2022  (TW) ................................. 111207307

(51) Int. Cl.
*B29C 73/08*    (2006.01)

(52) U.S. Cl.
CPC .................................... *B29C 73/08* (2013.01)

(58) Field of Classification Search
CPC ............................... B29C 73/08; B60C 25/16

USPC ......................................................... 156/423
See application file for complete search history.

(56) References Cited

U.S. PATENT DOCUMENTS

| 2008/0127425 A1* | 6/2008 | Chen ...................... B29C 73/08 81/57.44 |
| 2014/0298956 A1* | 10/2014 | Kerner .................... B29C 73/06 81/15.7 |

OTHER PUBLICATIONS

Jeong, S., et al., "English machine-translation by Clarivate Analytics of KR-20200023114-A with full KR patent application included", B60C25/16, Aug. 24, 2018. (See NPL Filed on Mar. 12, 2025). (Year: 2018).*

* cited by examiner

*Primary Examiner* — Abbas Rashid
*Assistant Examiner* — Gregory C. Grosso
(74) *Attorney, Agent, or Firm* — Muncy, Geissler, Olds & Lowe, P.C.

(57) ABSTRACT

A tire repair kit has two ends including a guiding tip end having a diameter gradually decreasing to form a tip head and a connection end adapted to connect with a tool and capable of being axially detaching from the tool, wherein a receiving space defined between the guiding tip end and the connection end adapted to hold a tire patch inside.

18 Claims, 3 Drawing Sheets

TIRE REPAIR KIT

FIELD OF INVENTION

The present invention relates to a repair tool, particularly to a tire repair kit for a bicycle.

BACKGROUND OF THE INVENTION

As riding a bicycle, to prevent one of tires of the bicycle from being broken by pressing a sharp objector, many riders will carry tire repair kits, such as tire repair needle and tire patch on them to repair the broken tire. to insert the tire patch into the broken hole in the broken tire, a tip end of the tire repair needle is formed as a branch structure to form a gap for holding the tire patch in the gap between the branch structure. The tire patch is inserted into the broken tire via the broken hole by the tip end of the tire repair needle, and the tire repair needle is pulled out from the tire. When the tire repair needle is pulled out from the tire, the tire patch is detached from the branch structure and keeps in the broken hole.

However, when the conventional tire repair kit is in use, the branch structure on the tip end of the conventional tire repair needle has a diameter to cause a secondary damage or many damages to the broken hole in the broken tire. Thus, air loss from the tire will be increased, and the tire patch will not completely seal the broken hole. In addition, the tire repair needle and the tire path are used as needed, so to carry and store the conventional tire repair kit is trouble for the user. Therefore, a tire repair kit for preventing from causing a secondary damage to a broken tire and for being conveniently stored is an improved target in the industry.

SUMMARY OF THE INVENTION

To prevent from causing a secondary damage to a broken hole of a broken tire and to solve a problem of inconveniently being stored due to a size of the conventional tool, the present invention provides a tire repair kit having two ends including a guiding tip end having a diameter gradually decreasing to form a tip head and a connection end adapted to connect with a tool and capable of being axially detaching from the tool, wherein a receiving space defined between the guiding tip end and the connection end adapted to hold a tire patch inside.

Wherein, the tire repair kit is shaped as a column, and the connection end has a connection structure formed axially on the connection end, and the connection structure is a circular hole, a rectangular hole, a hexagonal hole, or a polygonal hole.

Wherein, a holding hole is defined diametrically in the tire repair kit, and the receiving space is defined in the holding hole.

Wherein, two holding holes are defined diametrically in the tire repair kit, and the receiving space is defined in the two holding holes.

Wherein, a notch is formed through a periphery of the guiding tip end to form the guiding tip end as a fork structure, the fork structure includes a first tip head portion and a second tip head portion, and the notch is formed between the first tip portion and the second tip portion.

Wherein, the notch extends axially from tip head toward holding holes and communicating with an adjacent one of the holding holes.

Wherein, a notch is defined in a side of the tip head and communicating with an adjacent one of the holding holes, the guiding tip end is divided into a first tip head portion having a long length and a second tip head portion having a short length shorter than the long length of the first tip head portion, and a stop portion is formed on the second tip portion and protruding toward the receiving space.

Wherein, a direction in which the notch defined through the tire repair kit is same as a direction in which the holding hole defined through the tire repair kit.

Wherein, a neck structure is formed on an outer surface of the tire repair kit and is adjacent to the connection end, and the connection end having a diameter smaller than a diameter of the outer surface to form a flange between the outer surface and the connection end.

Wherein, the tire repair kit is made of a biodegradable material.

When the tool in accordance with the present invention is in use, the connection end of the tire repair kit is connected with a tool, and a tire patch is held in the receiving space. The guiding tip end is inserted into a broken hole in a broken tire by the hand-held tool. When the tire repair kit extends through and expand the broken hole, the broken hole closely wraps around the periphery of the tire repair kit. With the inserting direction of the tire repair kit and pressing pressure provided by the wrapping force of the broken hole, two ends of the tire patch extending out of the receiving space are bent toward the connection end. When the tire repair kit is all inserted through the broken hole, at least a part of two ends of the tire patch and at least a part of the hand-held tool are still held in the broken hole. Then, the hand-held tool is pulled out from the broken hole in the broken tire and is detached from the connection end of the tire repair kit. At this time, the tire repair kit is held in the tire, and the tire patch extends out of the broken hole. Accordingly, the broken tire is repaired.

The tire repair toll in accordance with the present invention has the following advantages:

1. The tire repair kit has a small volume and a light weight, so the tire repair kit with a tire patch with a small volume is easily stored. A conventional tire repair needle is not needed, and therefore the storage space for the tire repair kit is reduced.
2. With the arrangement of the connection end and the neck structure, the tire repair kit can be applied to be connected with many kinds of hand-held tools in the market and is versatile in use.
3. The guiding tip end with a notch can be deformed by the pressing pressure of the broken hole, and the diameter of the guiding tip end can be decreased to prevent the broken hole is over-expanded to cause secondary damage to the broken hole. Thus, the broken hole can be completely sealed by the tire patch.
4. With the arrangement of multiple receiving spaces, position of the tire patch can be determined by the size of the broken hole.

DETAILED DESCRIPTION OF THE PREFERRED EMBODIMENTS

Figure 1:
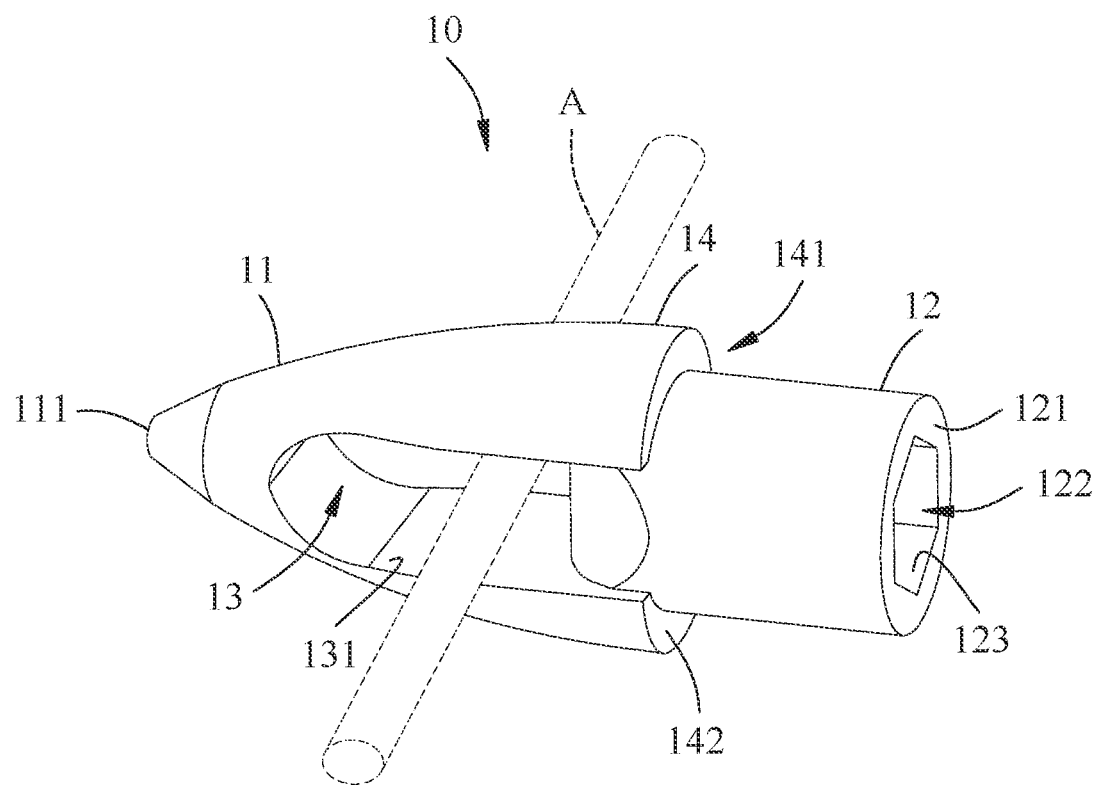
FIG. 1 is a perspective view of a first embodiment of a tire repair kit in accordance with the present invention.
Figure 2:
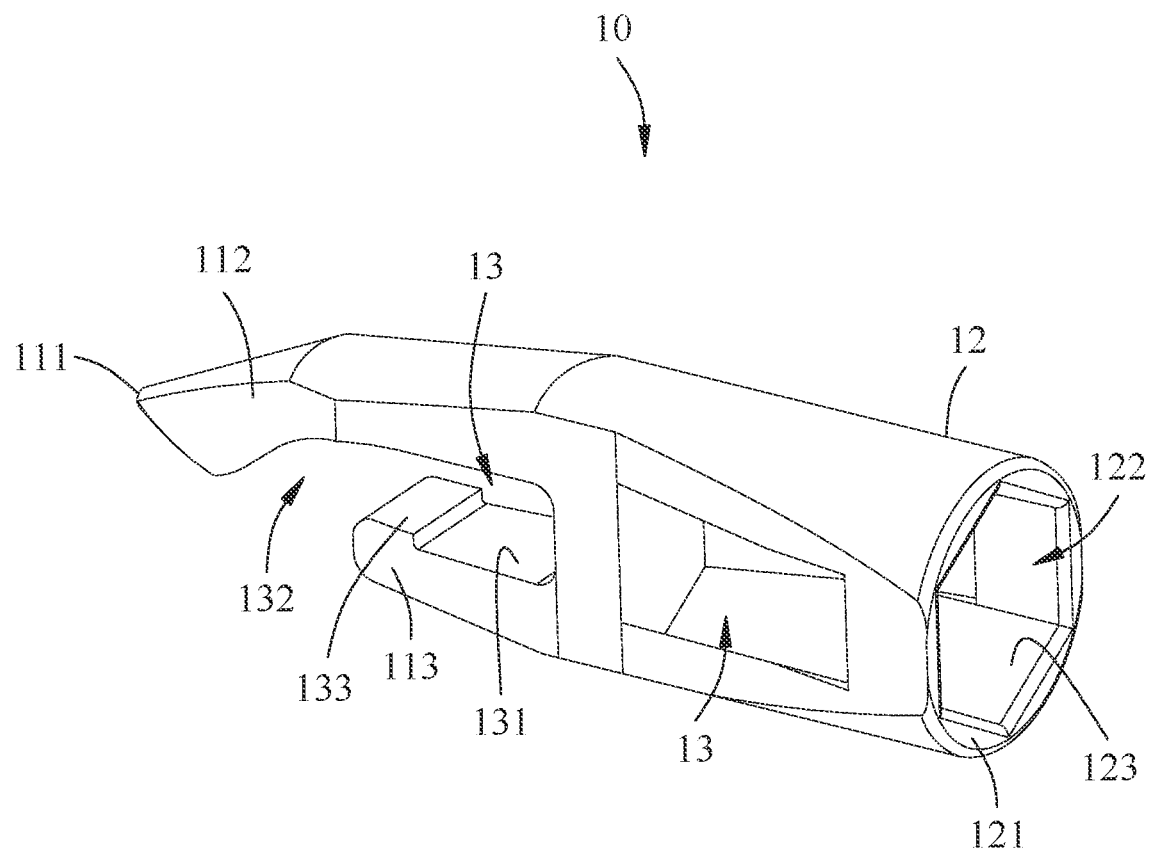
FIG. 2 is a perspective view of a second embodiment of a tire repair kit in accordance with the present invention.
Figure 3:
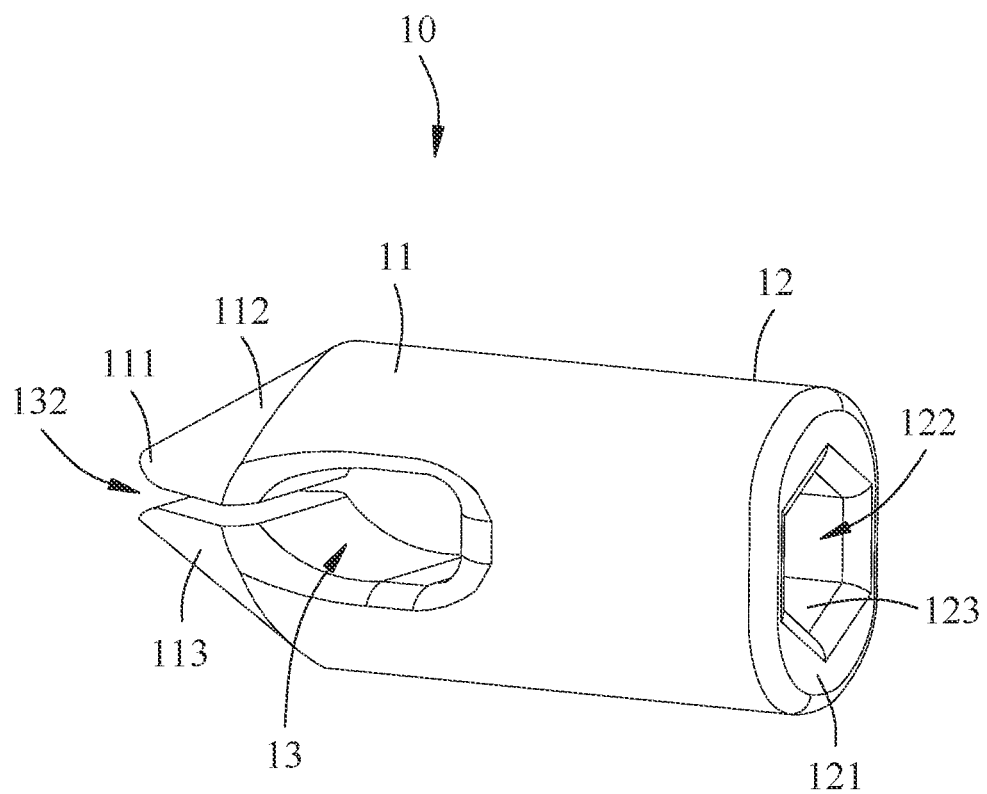
FIG. 3 is a perspective view of a third embodiment of a tire repair kit in accordance with the present invention.

With reference to FIGS. 1 to 3, a tire repair kit 10 in accordance with the present invention is shaped as a column and includes a guiding tip end 11 and a connection end 12 formed respective at two ends of the tire repair kit 10. A receiving space 13 is defined at a position is adjacent to the guiding tip end 11 to hold a tire patch A inside.

The guiding tip end 11 has a diameter gradually decreasing to a distal end of the tire repair kit 10 and forms a tip head 111 on the distal end of the guiding tip end 11. The connection end 12 is adapted to connect with a hand-held tool. When the connection end 12 is connected with a hand-held tool, the connected end 12 is selectively detached from the hand-held tool along an axial direction. The connection end 12 has an end face 121, a connection structure 122 is axially formed on the end face 121. The connection structure 122 may be a circular hole, a rectangular hole, a hexagonal hole, or a polygonal hole. In this embodiment, the connection structure is a hexagonal hole having an inner periphery 123 corresponding to an outer periphery of a regular Allen wrench. Accordingly, the tire repair kit 10 can be detachably connected with an Allen wrench via the connection structure 122 and is kept from rotating relative to the Allen wrench, and the tire repair kit is convenient in use.

Furthermore, when the connection structure 122 is a rectangular, the tire repair kit can be detachably connected with a slotted screw driver. In addition, the connection structure 122 may be a recess having an asymmetric shape, so a specific tool for connecting with the tire repair kit 10 having a specific connection structure 122 can be made. Thus, the tire repair kit 10 can be effectively held by the connection between the asymmetric recess and the specific tool. Accordingly, the tire repair kit can be designed as a specific connection manner based on the specific connection structure 122 or regular tools in the market, so the tire repair toll is versatile in use.

The receiving space 13 can hold a tire patch inside. The formation of the receiving space 13 is not limited in the present invention. With reference to FIG. 1, in the first embodiment, a holding hole 131 is defined diametrically through the tire repair kit at a position adjacent to the guiding tip end 11. The receiving space 13 is defined in the holding hole 131. Accordingly, a tire patch A can extend through the receiving space 13, and two ends of the tire patch extend out of the receiving space 13.

When the tire repair kit in accordance with the present invention is in use, the connection end 12 is connected with a hand-held tool, and a tire patch A is held in the receiving space 13. The guiding tip end 11 is inserted into a broken hole in a broken tire by a hand-held tool. With the resilience of the tire, when the tire repair kit 10 extends through and expands the broken hole, the broken hole closely wraps around the periphery of the tire repair kit 10. With the inserting direction of the tire repair kit 10 and pressing pressure provided by the wrapping force of the broken hole, two ends of the tire patch A extending out of the receiving space 13 are bent toward the connection end 12. When the tire repair kit 10 is all inserted through the broken hole, at least a part of two ends of the tire patch A and at least a part of the hand-held tool are still held in the broken hole. Then, the hand-held tool is pulled out from the broken hole in the broken tire and is detached from the connection end 12 of the tire repair kit 10. At this time, the tire repair kit 10 is held in the tire, and the tire patch A extends out of the broken hole. Accordingly, the broken tire is repaired.

In the embodiment shown in FIG. 3, in the differences from the aforementioned embodiment, the holding hole 131 extends axially toward the guiding tip end 11, and a notch 132 defined diametrically through the tire repair kit 10 to form a fork structure on the guiding tip end 11. The guiding tip end 11 is divided into a first tip head portion 112 and a second tip head portion 113 by the notch 132. Thus, when the guiding tip end 11 of the tire repair kit is inserted into the broken hole, the first tip head portion 112 and the second tip head portion 113 gapped by the notch 132 can be pushed toward each other by the pressing pressure of the broken hole. The diameter of the guiding tip end 11 can be reduced and can be deformed due to the pressing pressure. Therefore, the broken hole can be prevented from being over-expanded to cause a secondary damage to the broken hole, and the tire patch A can closely seal the broken hole.

With reference to FIG. 2, in the second embodiment, the difference from the aforementioned embodiments is that two holding holes 131 are defined diametrically through the tire repair kit 10, and a notch 132 is formed through a periphery of the guiding tip end 11 to form the guiding tip end 11 as a fork structure. In the present embodiment, the notch 132 is defined in a side of the tip head 111. A direction in which the notch 132 defined through the tire repair kit 10 is same as a direction in which the holding holes 131 defined through the tire repair kit 10. The guiding tip end 11 is divided into a first tip head portion 112 and a second tip head portion, 113, the first tip head portion 112 has a long length longer than a small length of the second tip head portion 113. The first tip head portion 112 includes the tip head 111. In addition, the communicating notch 132 and the holding hole 131 define the receiving space 13.

Preferably, a stop portion 133 is formed on the second tip head portion 113 and protrudes into the receiving space 13. When the tire patch A is held in the receiving space 13, the tire patch can be stopped by the stop portion 133 to keep the tire patch A from escaping from the notch 132. When in use, the two holding holes 131 can be applied to hold the tire patch A. Therefore, the number of the tire patch A put into the holding holes can be determined by demands, such as the size of the broken hole. The tire repair kit is versatile in use.

Moreover, a neck structure 141 is formed on an outer surface 14 of the tire repair kit 10 and is adjacent to the connection end 12. The neck structure 14 extends toward the connected end 12 and to the end face 121. The connection end 12 has a diameter smaller than a diameter of the outer surface 14 to form a flange 142 between the outer surface 14 and the connection end 12. The neck structure 14 on the tire repair kit 10 can be inserted into a recess defined in a hand-held tool, and the neck structure 14 can be axially detached from the hand-held tool.

Preferably, the diameter of the recess in the hand-held tool is between an outer diameter of the connection end 12 and an outer diameter of the outer surface 14. Preferably, the diameter of the recess corresponding to the outer diameter of the connection end 12. When the tire repair kit 10 is connected with the hand-held tool, a distal end of the recess will abut against the flange 142 to keep the tire repair kit 10 from falling into the recess. The recess may be a through hole formed through a rod or a tube. Accordingly, the tire repair kit 10 can be applied to connect with a hollow rod or a tube.

A specific hand-held tool fitting with the neck structure 14 of the tire repair kit can be made, such that the connection structure for fitting with regular hand-held tool and the neck structure 14 fitting with a specific hand-held tool can be formed on a single tire repair kit simultaneously. Accordingly, the tire repair kit is versatile in use.

The tire repair kit 10 in accordance with the present invention is held inside the tire after being used, so the broken hole does not be expanded many times to cause secondary damage. The tire repair kit 10 is preferably made of a biodegradable material. The biodegradable material may be polyactide (PLA), polyester (PBS, PBAT), or polyhydroxyalkanoates (PHA). Accordingly, the tire repair kit has a small volume and a light weight, and is friendly to the environment. For a user, the tire repair kit with a small volume and a light weight is easily to carry and is conveniently store with the tire patch with a small volume. The tire repair kit 10 can be fitted with a regular hand-held tool in the market, so a tire repair needle is not needed for saving the storage space.

What is claimed is:

1. A tire repair kit comprising two ends including:
   a guiding tip end, wherein the guiding tip end has a diameter gradually decreasing to form a tip head;
   a connection end adapted to connect with a tool and capable of being axially detached from the tool; and
   a receiving space defined between the guiding tip end and the connection end adapted to hold a tire patch inside, wherein
   after connecting with the tool and placing the tire patch inside the receiving space, the guiding tip end is inserted into a hole in a tire by the tool, until the tire repair kit is fully inserted through the tire hole, and at least a part of two ends of the tire patch are held in the tire hole;
   the tire repair kit is held in the tire, and the tire patch extends out of a broken hole when the tool is detached from the connection end of the tire repair kit; and
   two holding holes are defined diametrically in the tire repair kit, and two receiving spaces are defined in the two holding holes.

2. The tire repair kit as claimed in claim 1, wherein the tire repair kit is shaped as a column, and the connection end has a connection structure formed axially on the connection end, wherein the connection structure is a circular hole, a rectangular hole, a hexagonal hole, or a polygonal hole.

3. The tire repair kit as claimed in claim 1, wherein a notch is formed through a periphery of the guiding tip end to form the guiding tip end as a fork structure, wherein the fork structure includes a first tip head portion and a second tip head portion, and the notch is formed between the first tip portion and the second tip portion.

4. The tire repair kit as claimed in claim 1, wherein a notch is formed through a periphery of the guiding tip end to form the guiding tip end as a fork structure, wherein the fork structure includes a first tip head portion and a second tip head portion, and the notch is formed between the first tip portion and the second tip portion.

5. The tire repair kit as claimed in claim 3, wherein the notch extends axially from tip head toward the two holding holes and communicates with the two holding holes.

6. The tire repair kit as claimed in claim 3, wherein a notch is defined in a side of the tip head and communicates with the two holding holes, the guiding tip end is divided into a first tip head portion having a long length and a second tip head portion having a short length shorter than the long length of the first tip head portion, and a stop portion is formed on the second tip portion and protruding toward the receiving space.

7. The tire repair kit as claimed in claim 4, wherein a direction in which the notch defined through the tire repair kit is the same as a direction in which the two holding holes are defined through the tire repair kit.

8. The tire repair kit as claimed in claim 5, wherein a direction in which the notch defined through the tire repair kit is the same as a direction in which the two holding holes are defined through the tire repair kit.

9. The tire repair kit as claimed in claim 3, wherein a neck structure is formed on an outer surface of the tire repair kit and is adjacent to the connection end, and the connection end has a diameter smaller than a diameter of the outer surface to form a flange between the outer surface and the connection end.

10. The tire repair kit as claimed in claim 4, wherein a neck structure is formed on an outer surface of the tire repair kit and is adjacent to the connection end, and the connection end has having a diameter smaller than a diameter of the outer surface to form a flange between the outer surface and the connection end.

11. The tire repair kit as claimed in claim 5, wherein a neck structure is formed on an outer surface of the tire repair kit and is adjacent to the connection end, and the connection end has a diameter smaller than a diameter of the outer surface to form a flange between the outer surface and the connection end.

12. The tire repair kit as claimed in claim 6, wherein a neck structure is formed on an outer surface of the tire repair kit and is adjacent to the connection end, and the connection end has a diameter smaller than a diameter of the outer surface to form a flange between the outer surface and the connection end.

13. The tire repair kit as claimed in claim 7, wherein a neck structure is formed on an outer surface of the tire repair kit and is adjacent to the connection end, and the connection end has a diameter smaller than a diameter of the outer surface to form a flange between the outer surface and the connection end.

14. The tire repair kit as claimed in claim 1, wherein the tire repair kit is made of a biodegradable material.

15. The tire repair kit as claimed in claim 3, wherein the tire repair kit is made of a biodegradable material.

16. The tire repair kit as claimed in claim 5, wherein the tire repair kit is made of a biodegradable material.

17. The tire repair kit as claimed in claim 6, wherein the tire repair kit is made of a biodegradable material.

18. The tire repair kit as claimed in claim 7, wherein the tire repair kit is made of a biodegradable material.

* * * * *